United States Patent
Chen

(10) Patent No.: US 8,469,566 B2
(45) Date of Patent: Jun. 25, 2013

(54) VEHICLE HEADLIGHT STRUCTURE

(75) Inventor: Ming-Yuan Chen, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 267 days.

(21) Appl. No.: 13/105,900

(22) Filed: May 12, 2011

(65) Prior Publication Data
US 2011/0317444 A1    Dec. 29, 2011

(30) Foreign Application Priority Data
Jun. 25, 2010 (TW) ................ 99120770 A

(51) Int. Cl.
*B60Q 1/04* (2006.01)
*B60Q 1/02* (2006.01)

(52) U.S. Cl.
USPC .......................................... 362/523; 362/546

(58) Field of Classification Search
USPC .................. 362/464–468, 523–537, 543–549
See application file for complete search history.

(56) References Cited

U.S. PATENT DOCUMENTS

| 2002/0018348 A1* | 2/2002 | Miki et al. ............... 362/514 |
| 2011/0116280 A1* | 5/2011 | Lee et al. ................ 362/523 |

\* cited by examiner

*Primary Examiner* — Karabi Guharay
*Assistant Examiner* — Nathaniel Lee
(74) *Attorney, Agent, or Firm* — Leong C. Lei

(57) ABSTRACT

A vehicle headlight includes a cover and a housing, which receive therein a primary light source unit mounted to a bulb seat of the housing and a position light unit mounted to a position light seat of the housing. The housing forms a first water barrier wall above the bulb seat and also forms a second water barrier wall above the position light and the position light seat. The second water barrier wall is arranged between the first water barrier wall and an adjustment mechanism and located exactly below the first water barrier wall. The adjustment mechanism is secured to the housing and located below the second water barrier wall. The first and second water barrier walls help prevent external water from eroding the primary light source unit and the position light unit, and the adjustment mechanism facilitates adjustment of elevation angle of the headlight.

14 Claims, 7 Drawing Sheets

VEHICLE HEADLIGHT STRUCTURE

(a) TECHNICAL FIELD OF THE INVENTION

The present invention generally relates to a vehicle headlight structure, and more particularly to a structure for realizing easy fine adjustment of elevation angle of headlight.

(b) DESCRIPTION OF THE PRIOR ART

A known vehicle headlight is disclosed in Taiwan Patent Publication No. 097113513 filed by the present inventor and shown in FIG. 1 of the attached drawings. The known headlight, generally designated at 1, comprises a housing body 11, which forms, on two sides thereof, mounting seats 12. Each mounting seat 12 is provided with a fastener 121 attached thereto. The mounting seat 12 is coupled by a threaded fastener 122 to a positioning tab 21 of an outside cover 2 that is attached to a vehicle. The housing body 11 of the headlight 1 also comprises an adjustment mechanism 13, which is composed of a receiving compartment 131, a support board 132, an elastic element 133, and an adjustment bolt 134.

With the mounting seats 12 formed on the two sides of the headlight 1 the housing body 11, coupling between the mounting seats 12 and the outside cover 4 of the vehicle forms a rotation support point. The housing body 11 of the headlight 1 is provided with the adjustment mechanism 13, and the receiving compartment 131 of the adjustment mechanism 13 receives therein the support board 132, the elastic element 133, and the adjustment bolt 134, whereby the elastic element 133 is compressed between an inside wall 1311 of the receiving compartment 131 and the support board 132. Through rotation of the adjustment bolt 134, the adjustment bolt 134 is caused to make fine adjustment of distance within a threaded hole 1313 defined in the side wall 1311, whereby the headlight 1, as being supported by the mounting seats 12 on the two sides as a rotation support point, is allowed to do fine adjustment for the elevation angle of the headlight 1 and thus fine adjustment of tilt angle of illumination of the headlight 1 is realized.

The arrangement disclosed in Taiwan Patent Publication No. 097113513 is effective in simplifying the adjustment of tilt angle of the headlight 1, but Taiwan Patent Publication No. 097113513 is disadvantageous in that insufficient protection is provided for light sources of the headlight 1 and incapable of incorporating a position light in the front end of the vehicle to indicate the position of the vehicle due to the housing body 11 of the headlight 1 being provided with an adjustment mechanism 13. Apparently, additional improvement is needed in order to enhance the performance of the vehicle headlight 1.

SUMMARY OF THE INVENTION

The primary technical feature according to the present invention is to provide a vehicle headlight, which comprises at least a cover, a housing, and an adjustment mechanism. The cover and the housing receive and retain therein a primary light source unit and a position light unit. The primary light source unit is mounted to a bulb seat of the housing, and the position light unit is mounted to the position light seat of the housing. The housing forms a first water barrier wall above the bulb seat. The housing also forms a second water barrier wall above the position light and the position light seat. The second water barrier wall is arranged between the first water barrier wall and the adjustment mechanism and located exactly below the first water barrier wall. The adjustment mechanism is secured to the housing and located below the second water barrier wall. The first water barrier wall and the second water barrier wall help preventing external water from eroding the primary light source unit and the position light unit, so as to enhance the performance of the headlight.

Another technical feature according to the present invention is to provide a vehicle headlight, which comprises at least a cover, a housing, and an adjustment mechanism. The cover and the housing receive and retain therein a primary light source unit and a position light unit. The primary light source unit is mounted to a bulb seat of the housing, and the position light unit is mounted to the position light seat of the housing. The housing forms a first water barrier wall above the bulb seat. The housing also forms a second water barrier wall above the position light and the position light seat. The second water barrier wall is arranged between the first water barrier wall and the adjustment mechanism and located exactly below the first water barrier wall. The adjustment mechanism is secured to the housing and located below the second water barrier wall. The first water barrier wall and the second water barrier wall help preventing external water from eroding the primary light source unit and the position light unit, so as to enhance the performance of the headlight.

A further technical feature of the present invention is to provide a vehicle headlight, which comprises at least a cover, a housing, and an adjustment mechanism, wherein the adjustment mechanism comprises an adjustment base having a retention section in which a through hole having an elongate shape is formed to help simplifying assembling of the adjustment base, an elastic element, an adjustment bolt, and an adjustment block.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
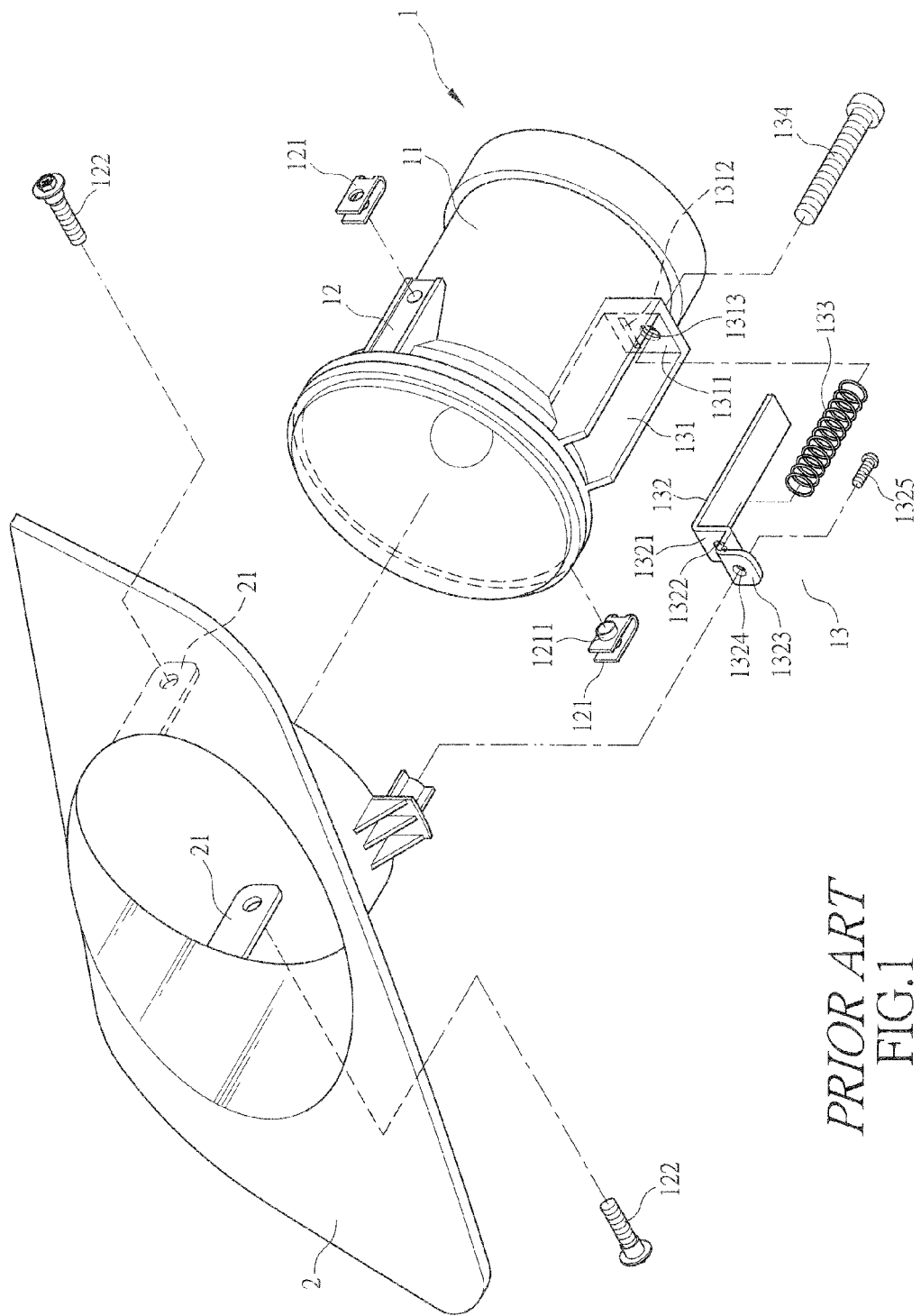
FIG. 1 shows a vehicle headlight according to Taiwan Patent Application No. 0971/3513.
Figure 2:
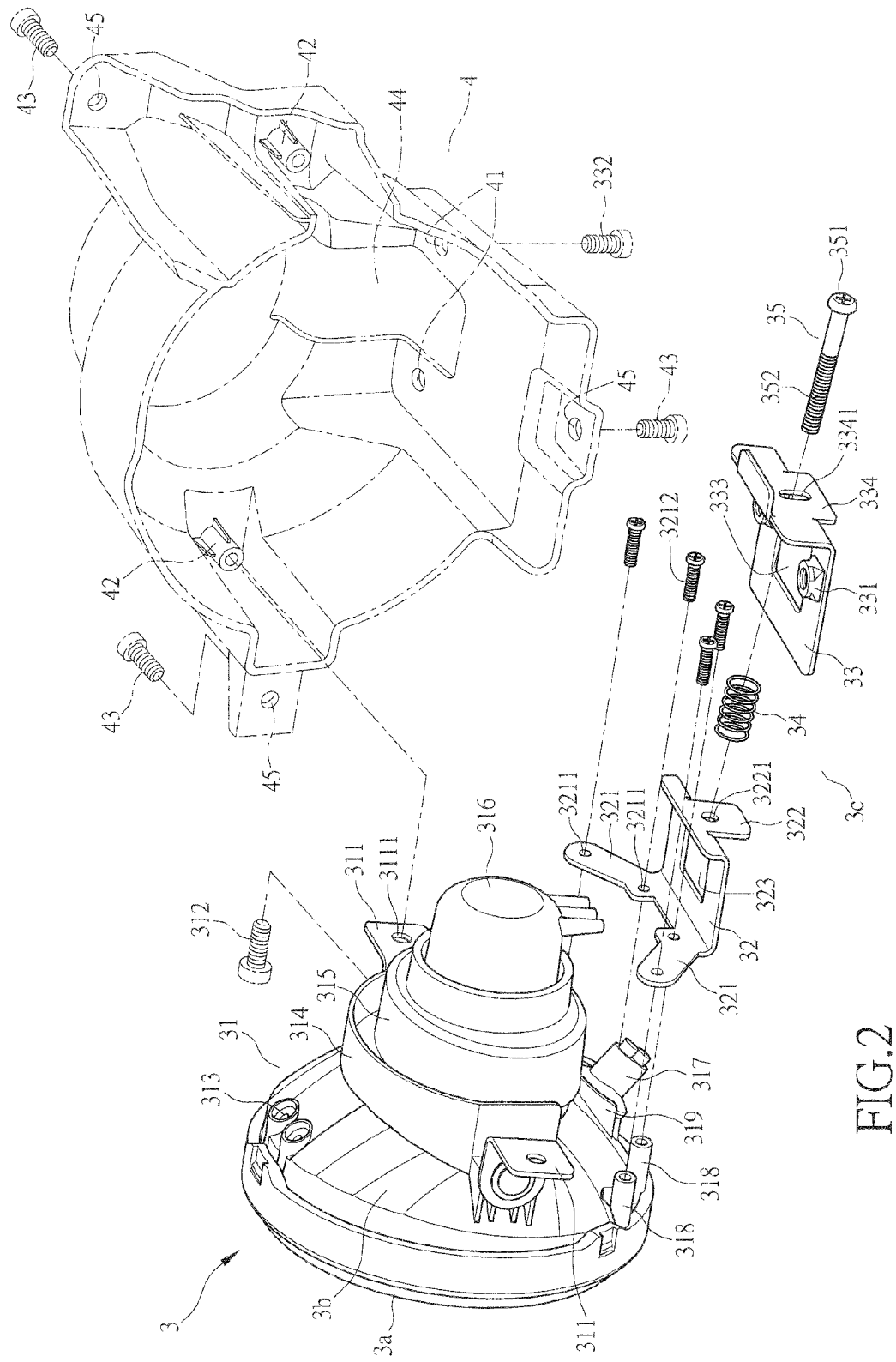
FIG. 2 is an exploded view of a headlight according to the present invention.

Referring first to FIG. 2, the present invention provides a structure of a headlight, generally designated at 3. The headlight 3 comprises at least a cover 3a, a housing 3b, and an adjustment mechanism 3c.

The cover 3a comprises a light-transmitting member, which is attached to and covers a front end of the housing 3b.

The housing 3b comprises a housing body 31. The housing body 31 forms, on two sides thereof, mounting lugs 311. The mounting lugs 311 form mounting holes 3111. Threaded fasteners 312 are received through the mounting holes 3111 to secure the headlight 3 to mounting pegs 42 formed on a headlight mounting seat 4. The housing body 31 forms in an upper portion thereof heat dissipation holes 313. The heat dissipation holes 313 functions to dissipate high temperature generated by a primary light source unit 3161. A first water barrier wall 314 is formed below the heat dissipation holes 313, and the first water barrier wall 314 extends in opposite sideway direction and further extends downward to the mounting lugs 311. A water seal fitting 315 is formed below the first water barrier wall 314 and a bulb seat 316 is arranged in the water seal fitting 315. The bulb seat 316 functions to receive and retain therein the primary light source unit 3161 of the headlight 3. The first water barrier wall 314 and the water seal fitting 315 function to prevent external water from eroding the primary light source unit 3161. A position light seat 317 is arranged below the bulb seat 316 and the position light seat 317 functions to receive and retain a position light unit 3171. The position light 3171 is provided to indicate the position of the vehicle. A second water barrier wall 319 is arranged above the position light seat 317, whereby the second water barrier wall 319 is located between the first water barrier wall 314 and the adjustment mechanism 3c. Further, the second water barrier wall 319 is located exactly below the first water barrier wall 314. Thus, the second water barrier wall 319 functions to prevent external water from eroding the position light unit 3171. Coupling seats 318 are provided on opposite sides below the mounting lugs 311 and the coupling seats 318 function for coupling an adjustment block 32.

The adjustment mechanism 3c comprises the adjustment block 32, an adjustment base 33, an elastic element 34, and an adjustment bolt 35. The adjustment mechanism 3c is secured to the housing 3b.

The adjustment block 32 forms, in one end thereof, two coupling sections 321 respectively corresponding to the coupling seats 318 of the housing body 31. The coupling sections 321 form coupling holes 3211, whereby threaded fasteners 3212 are receivable through the coupling holes 3211 to couple the adjustment block 32 to the housing body 31. The adjustment block 32 has an opposite end forming a stop section 322 that extends downward. The stop section 322 forms a threaded hole 3221. An opening 323 is formed between the coupling seats 318 and the stop section 322 and the opening 323 provides a space for facilitating adjustment by the adjustment bolt 35.

The adjustment base 33 forms two threaded fixing holes 331, whereby with threaded fasteners 332 are receivable through the threaded fixing holes 331 to fix the adjustment base 33 to fixing holes 41 formed in the headlight mounting seat 4. A slot 333 is formed between the threaded fixing holes 331 and the slot 333 functions to accommodate the stop section 322 of the adjustment block 32 therein. The slot 333 has an end from which a retention section 334 extends upward. The retention section 334 forms an elongate through hole 3341. With the elongate shape of the through hole 3341, adjustment can be made when the adjustment base 33 and the adjustment block 32 are being assembled, whereby the assembling operation of the adjustment base 33 and the adjustment block 32 can be simplified.

The elastic element 34 is arranged between the adjustment block 32 and the adjustment base 33, whereby an end of the elastic element 34 is positioned against the stop section 322 of the adjustment block 32, while an opposite end is supported by the retention section 334 of the adjustment base 33.

The adjustment bolt 35 comprises a head 51 and a threaded section 52. The adjustment bolt 35 is received through the through hole 3341 of the retention section 334 of the adjustment base 33 and is further received through the elastic element 34 to engage the threaded hole 3221 of the stop section 322 of the adjustment block 32 with the threaded section 52 thereof.

Mounting and operation of the headlight 3 according to the present invention will be described with reference to FIGS. 2 and 5. The headlight mounting seat 4 is provided for supporting the headlight 3. The headlight mounting seat 4 comprises the fixing sections 41, the mounting pegs 42, threaded fasteners 43, an adjustment opening 44, and securing sections 45. The fixing sections 41 are provided for fixing the adjustment base 33 and the mounting pegs 42 for fixing the housing body 31 of the headlight 3. The adjustment opening 44 allows outward extension of the adjustment bolt 35 therethrough. The securing sections 45 secure the headlight mounting seat 4 to a vehicle 5.

Figure 3:
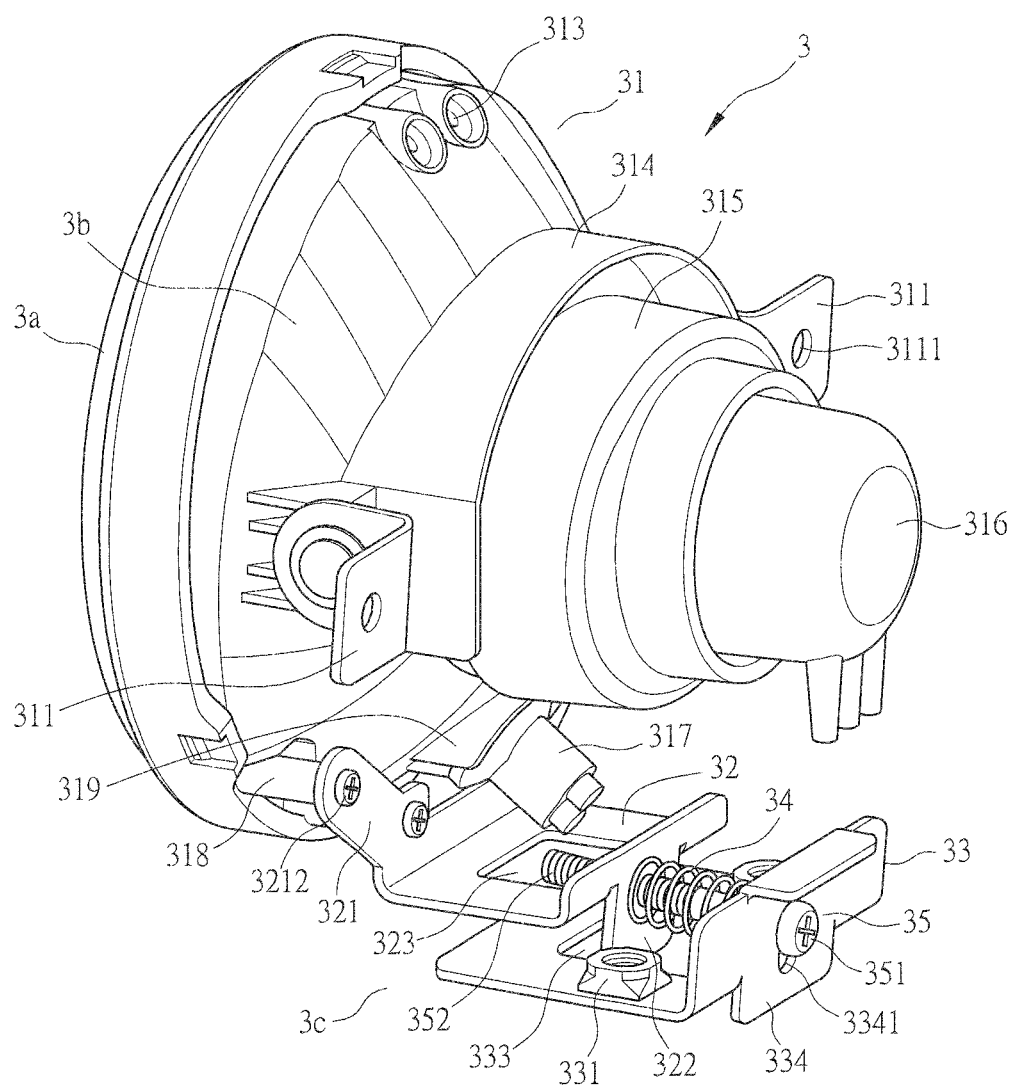
FIG. 3 is a perspective view of the headlight according to the present invention.
Figure 4:
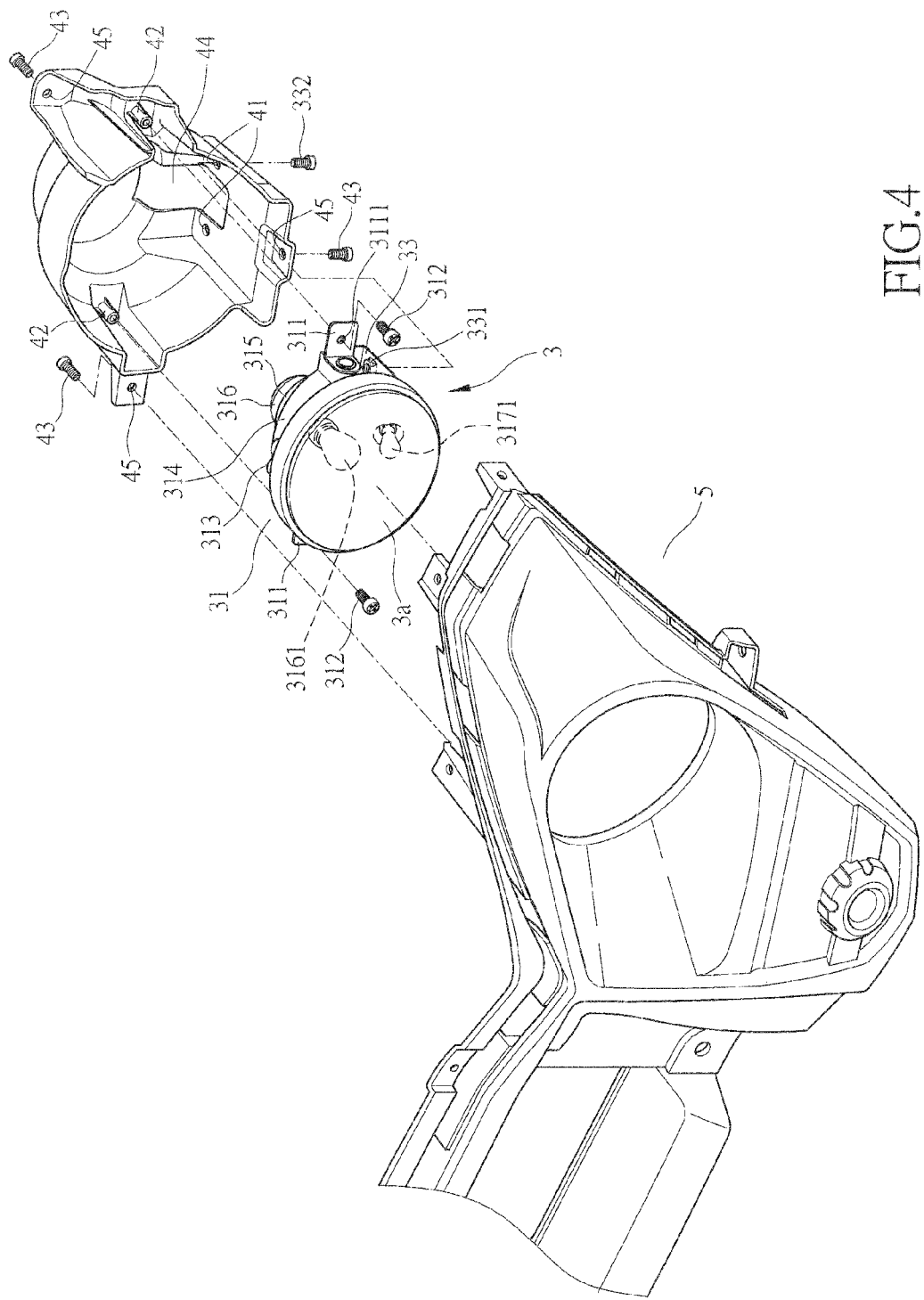
FIG. 4 is a schematic view illustrating assembling of the headlight according to the present invention and a headlight mounting seat to a vehicle.
Figure 5:
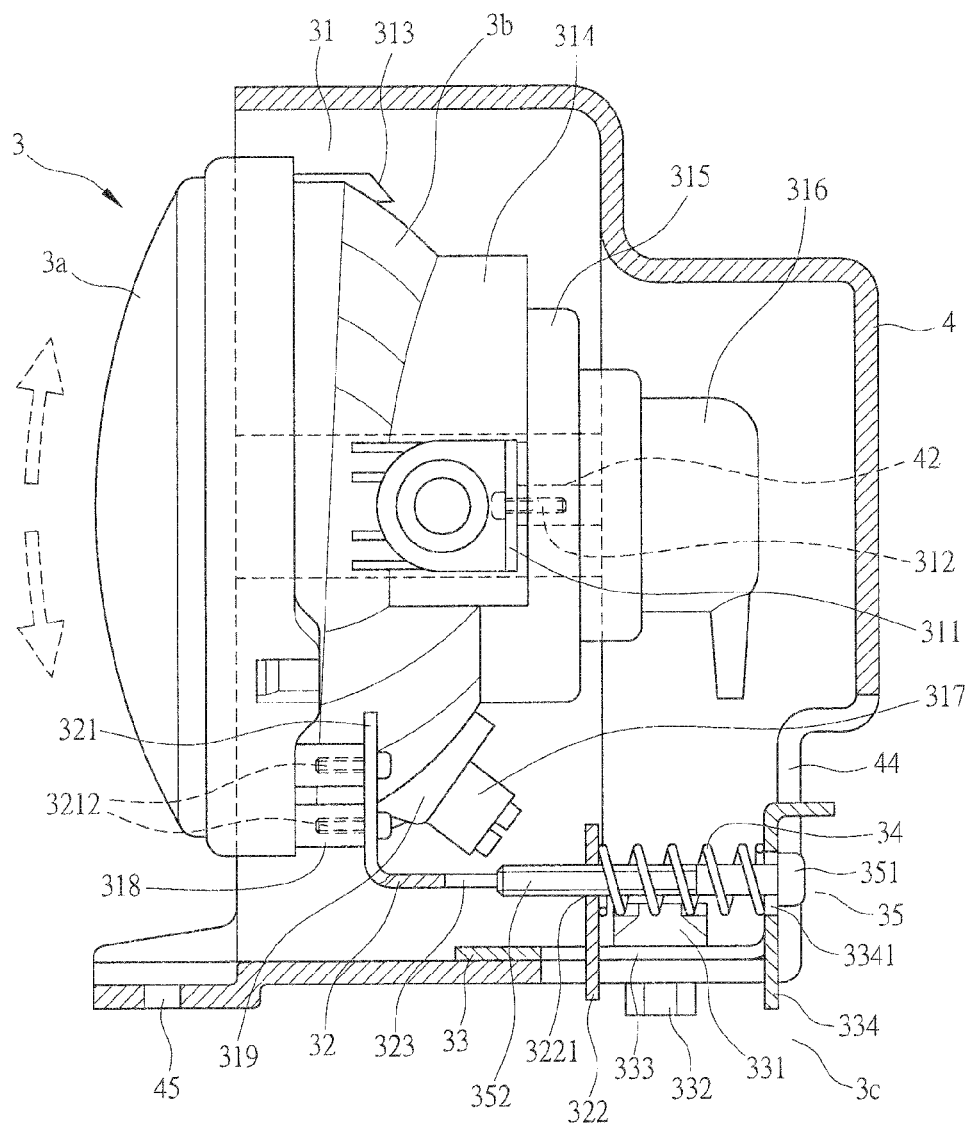
FIG. 5 is a cross-sectional view of the headlight according to the present invention.

To practice the present invention, as shown in FIGS. 2, 3, 4, and 5, firstly, the adjustment block 32 is coupled, through the threaded fasteners 3212 received through the coupling holes 3211 of the coupling sections 321, to the coupling seats 318 of the housing body 31 of the headlight 3. And then, the adjustment base 33 and the elastic element 34 are secured, together with the adjustment bolt 35, to the adjustment block 32, as shown in FIG. 3. Afterwards, the housing body 31 of the headlight 3 is secured through the mounting lugs 311 on two sides to the mounting pegs 42 of the headlight mounting seat 4 by the threaded fasteners 312. As such, the headlight 3 is rotatable with the mounting lugs 311 serving as a rotation center. The adjustment base 33 is secured by the threaded fasteners 332 to the fixing holes 41 of the headlight mounting seat 4. When the headlight 3 and the headlight mounting seat 4 are assembled, the stop section 322 of the adjustment block 32 is located within the slot 333 of the adjustment base 33. As such, a range of movement of the stop section 322 of the adjustment block 32 is confined within the slot 333 of the adjustment base 33, as shown in FIGS. 2 and 5. An end of the adjustment bolt 35 is located within the opening 323 of the adjustment block 32, while the opposite end is in the adjustment opening 44 of the headlight mounting seat 4. As such, after being assembled, the headlight 3 and the headlight mounting seat 4 can be secured by the threaded fasteners 43 to the vehicle 5. As such, after the assembly of the adjustment mechanism 3c to the housing 3b, interference with the position light seat 317 can be avoided, enabling incorporation of the position light 3171 with the headlight 3.

Figure 6:
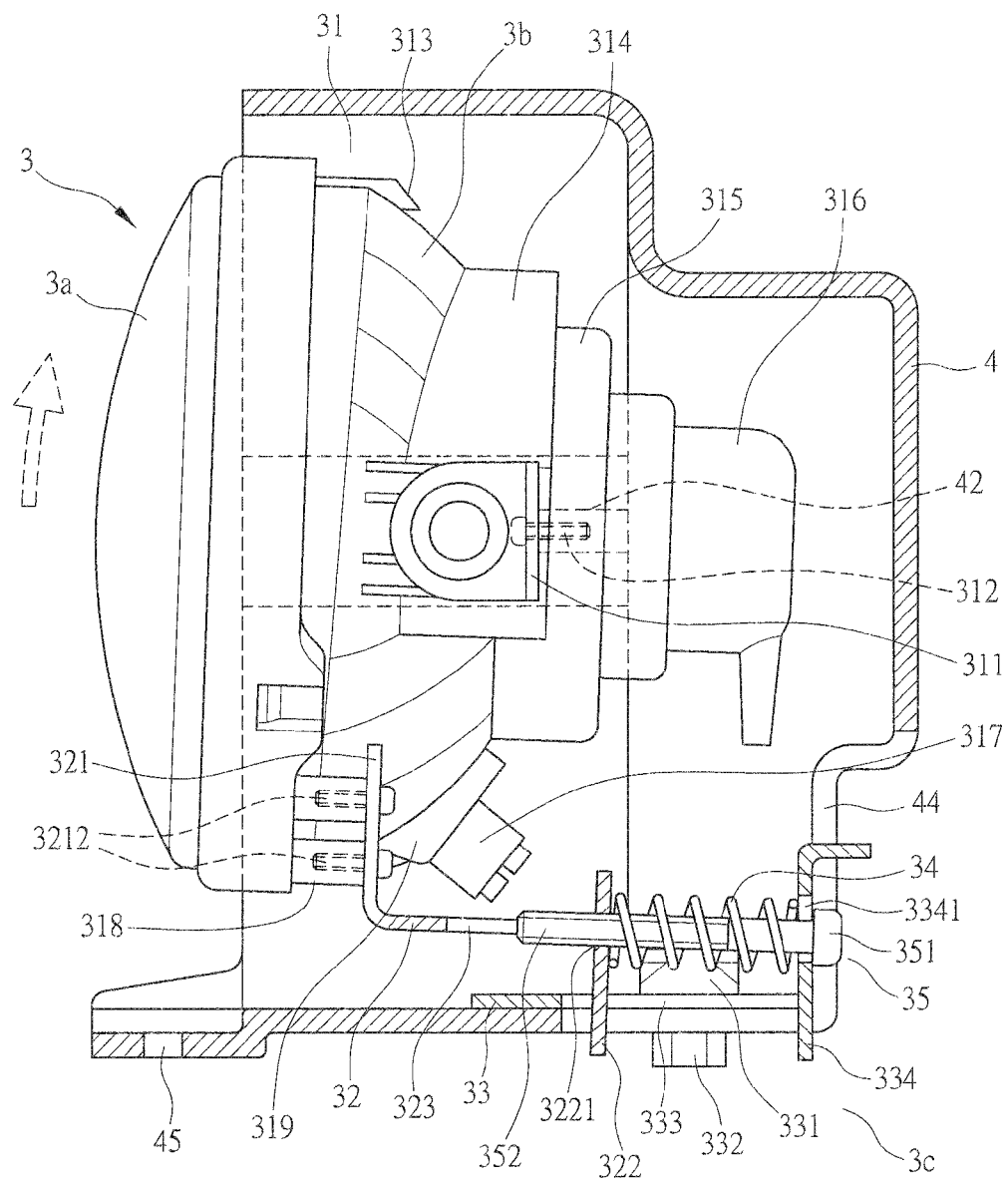
FIGS. 6 and 7 are cross-sectional view illustrating adjustment of elevation angle of the headlight according to the present invention.
Figure 7:
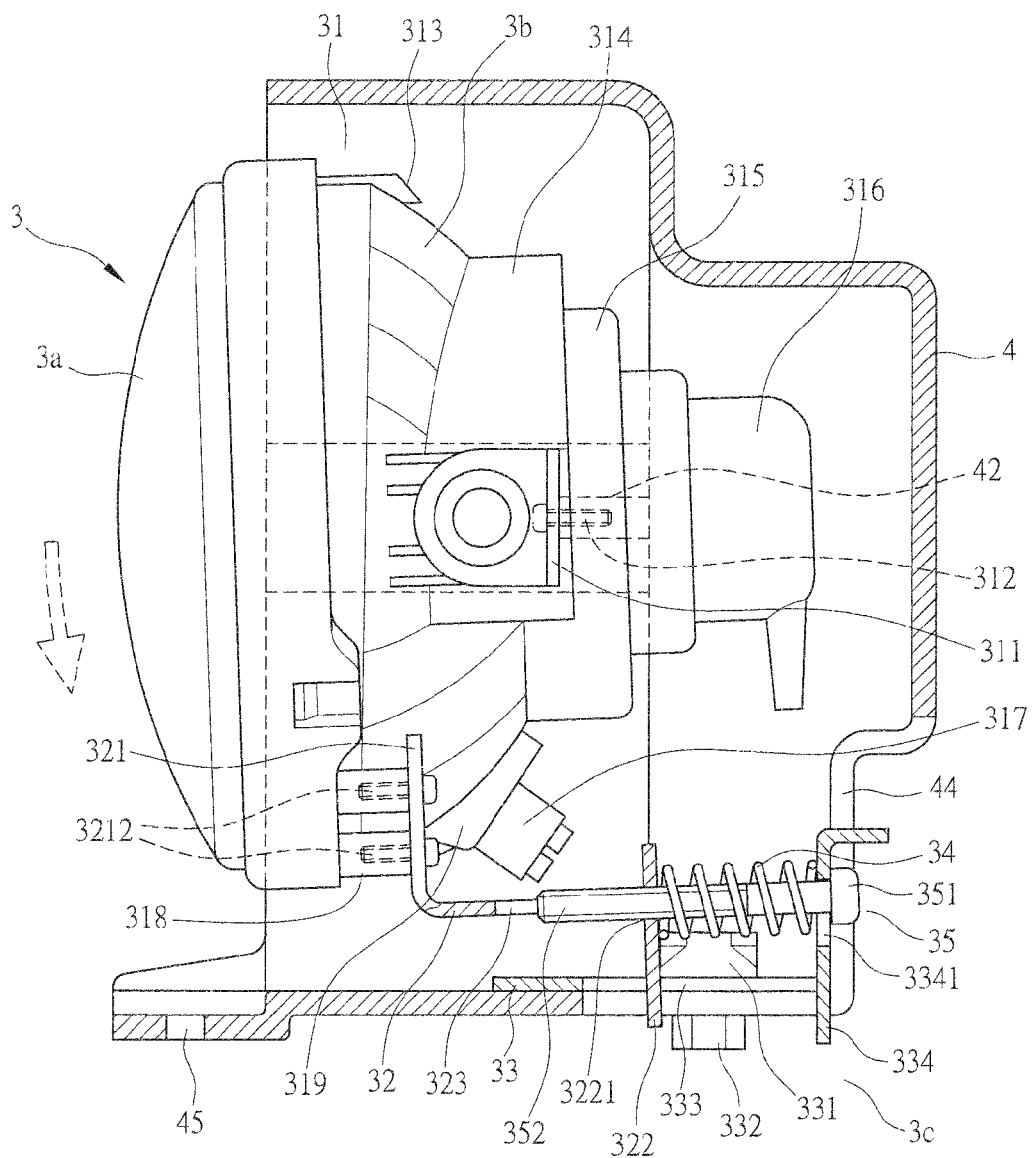

Referring to FIGS. 6 and 7, to adjust a tilt angle of illumination of the headlight 3, a tool is used to rotate the head 351 of the adjustment bolt 35 within the adjustment opening 44 of the headlight mounting seat 4, whereby the adjustment bolt 35, through the threaded hole 3221 of the stop section 322 of the adjustment block 32, compresses the elastic element 34, whereby the elastic element 34 provides a support force, so that when the adjustment bolt 35 is screwed to move in a direction toward or away from the housing body 31 of the headlight 3, the threaded section 352 of the adjustment bolt 35 is moved forward or backward within the opening 323 of the adjustment block 32. Under this condition, the headlight 3 rotates, with the mounting lugs 311 on the two sides of the housing body 31 and the mounting pegs 42 of the headlight mounting seat 4 as rotation support, to a desired upward/downward tilt angle thereby realizing adjustment of the elevation angle of the headlight 3 and change the illumination distance of the headlight 3.

An effect of the present invention is that the first water barrier wall 314 is arranged below the heat dissipation holes 313 of the housing body 31 of the housing 3b and the first water barrier wall 314 extends sideways in opposite sides and downwards to the mounting lugs 311, the water seal fitting 315 is arranged below the first water barrier wall 314, and the bulb seat 316 is arranged in the water seal fitting 315 and the bulb seat 316 receives and retains therein the primary light source unit 3161 of the headlight 3, whereby the first water barrier wall 314 and the water seal fitting 315 prevents external water from eroding the primary light source unit 3161, and the position light seat 317 is arranged below the bulb seat 316 and the position light seat 317 receives and retains therein the position light unit 3171, the position light 3171 being provided to indicate the position of vehicle, and the second water barrier wall 319 is arranged above the position light seat 317, namely the second water barrier wall 319 is located between the first water barrier wall 314 and the adjustment mechanism 3c, whereby the second water barrier wall 319 prevents external water from eroding the position light unit 3171, so that the efficacy of use of the headlight 3 is enhanced.

Another effect of the present invention is that the mounting lugs 311 are arranged on opposite sides of the housing body 31 of the headlight 3, the mounting lugs 311 are coupled to the mounting pegs 42 of the headlight mounting seat 4 to form a support for rotation, and the stop section 322 of the adjustment block 32 is located within the slot 333 of the adjustment base 33, whereby the threaded section 352 of the adjustment bolt 35 is movable forward/backward within the opening 323 of the adjustment block 32 的 the opening 323 so that a tool (such as a screwdriver) can be used to operate through the adjustment opening 44 of the headlight mounting seat 4 for fine adjustment of distance for the adjustment bolt 35 to achieve fine adjustment of elevation angle of the headlight 3 and change the tilt angle of illumination of the headlight 3.

A further effect of the present invention is that the through hole 3341 of the retention section 334 of the adjustment base 33 is made elongated for fine adjustment purpose so that assembling of the adjustment base 33, the elastic element 34, the adjustment bolt 35, and the adjustment block 32 is simplified.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A vehicle headlight comprising at least a cover, a housing, and an adjustment mechanism, the cover and the housing receiving and retaining therein a primary light source unit and a position light the primary light source unit being mounted to a bulb seat of the housing, the position light unit being mounted to the position light seat of the housing, the housing forming a first water barrier wall above the bulb seat, characterized in that the housing forms a second water barrier wall above the position light and the position light seat, the second water barrier wall being arranged between the first water barrier wall and the adjustment mechanism and located exactly below the first water barrier wall, the adjustment mechanism being secured to the housing and located below the second water barrier wall.

2. The vehicle headlight according to claim 1, wherein the housing forms a heat dissipation hole.

3. The vehicle headlight according to claim 1, wherein the bulb seat arranged in the water seal fitting.

4. The vehicle headlight according to claim 1, wherein the housing forms the coupling seats, to which the adjustment mechanism is coupled.

5. The vehicle headlight according to claim 4, wherein the adjustment mechanism comprises an adjustment block, an adjustment base, an elastic element, and an adjustment bolt.

6. The vehicle headlight according to claim 5, wherein the adjustment base forms a retention section, which is formed to extend upward.

7. The vehicle headlight according to claim 5, wherein the retention section of the adjustment base forms an elongate through hole.

8. The vehicle headlight according to claim 5, wherein the adjustment bolt comprises a head and a thread.

9. The vehicle headlight according to claim 1, wherein the adjustment mechanism comprises an adjustment block, an adjustment base, an elastic element, and an adjustment bolt.

10. The vehicle headlight according to claim 9, wherein the adjustment base forms a retention section, which is formed to extend upward.

11. The vehicle headlight according to claim 9, wherein the retention section of the adjustment base forms an elongate through hole.

12. The vehicle headlight according to claim 9, wherein the adjustment bolt comprises a head and a thread.

13. The vehicle headlight according to claim 1, wherein the headlight is fixed to a headlight mounting seat, the headlight mounting seat comprising coupling sections, mounting pegs, threaded fasteners, an adjustment opening, and securing sections.

14. The vehicle headlight according to claim 13, wherein the securing sections of the headlight mounting seat are adapted to be secured to a vehicle.

* * * * *